Sept. 9, 1969 U. F. GIANOLA 3,466,627

CHARACTER RECOGNIZER CIRCUIT

Filed June 13, 1966 2 Sheets-Sheet 1

INVENTOR
U. F. GIANOLA
BY Herbert M. Shapiro
ATTORNEY

United States Patent Office 3,466,627
Patented Sept. 9, 1969

3,466,627

CHARACTER RECOGNIZER CIRCUIT

Umberto F. Gianola, Florham Park, N.J., assignor to Bell Telephone Laboratories Incorporated, Murray Hill, N.J., a corporation of New York Filed June 13, 1966, Ser. No. 557,241
Int. Cl. G11b *5/00*
U.S. Cl. 340—174 7 Claims This invention relates to information processing devices and, more particularly, to devices for recognizing characteristic information.

Devices for recognizing characteristic information, often termed "word recognizers" (or sequence detectors), are in widespread use in all types of communication and data processing systems. For example, in communication systems where a plurality of receivers are potentially capable of receiving a communication, each receiver includes, advantageously, a word recognizer for detecting a characteristic word designating that receiver as the receiver to which a communication is addressed. In the absence of the characteristic word (address) designating a receiver, that receiver is disabled from receiving the communication. This transmission arrangement is competitive with switching (tree) logic systems, primarily, to the extent that inexpensive word recognizers become available. Moreover, tree logic systems are impractical in certain instances such as in remote radio telephone receiver systems.

An object of this invention is to provide a new and novel, relatively inexpensive word recognizer.

The foregoing and further objects of this invention are realized in one embodiment thereof wherein a magnetic domain wall device is turned to account.

For a reference, a domain wall device is a device including a magnetic medium, typically a wire, in which reverse magnetized domains are nucleated in response to a first field in excess of a nucleation threshold and through which reverse domains are advanced in response to second fields in excess of a propagation threshold and less than the nucleation threshold. Typically, a reverse magnetized domain is provided by a first field at an input position of a suitably initialized magnetic wire and advanced toward an output position by step-along second fields generated in consecutive positions along the wire. The second fields, termed propagation fields, are provided in a well known four-phase sequence defining bit positions in each corresponding four-phase portion of the wire. A reverse domain occupies a two-phase portion of a bit position.

If the presence or absence of a reverse domain is made dependent on a binary one or binary zero input representation, such as a pulse or no pulse, on a nucleation conductor generating the nucleation field when pulsed, a corresponding pattern of domains is nucleated to be advanced through the wire thereafter by propagation pulses. If, further, the input is synchronized with the four-phase propagation sequence, a representation of binary information appears in each bit position. The magnetic wire is, usually, assumed magnetized initially in a first direction, the information then appears as a pattern of reverse domains (and the absence thereof) having magnetization in a second direction.

In accordance with this invention, an additional nucleation conductor couples an unstable length of each bit position in the magnetic wire to generate magnetic fields of coded first and second directions when pulsed. That additional nucleation conductor is pulsed every second propagation phase just after inputs are stored. If the sequence of inputs corresponds to the polarities of the coded magnetic fields, no flux is switched in the wire when that additional conductor is pulsed. For each mismatch, flux is temporarily switched in the corresponding bit position. A sense conductor coupled to the bit positions in like coded senses exhibits a null when the incoming character corresponds to the code of the additional "interrogate" conductor.

Accordingly, a feature of this invention is a character recognizer including a magnetic medium, means storing in bit positions of said medium a representation of binary input codes in terms of the presence and absence of domains magnetized in a reverse direction, and means coupled to the bit positions driving to coded initialized or reverse directions the magnetization in unstable portions of the bit positions for temporarily switching flux in those positions in which the binary input representations and the coded direction in the corresponding unstable portions do not match.

The foregoing and further objects and features of this invention will be fully understood from a consideration of the following detailed description rendered in conjunction with the accompanying drawing, in which.

Figure 1:
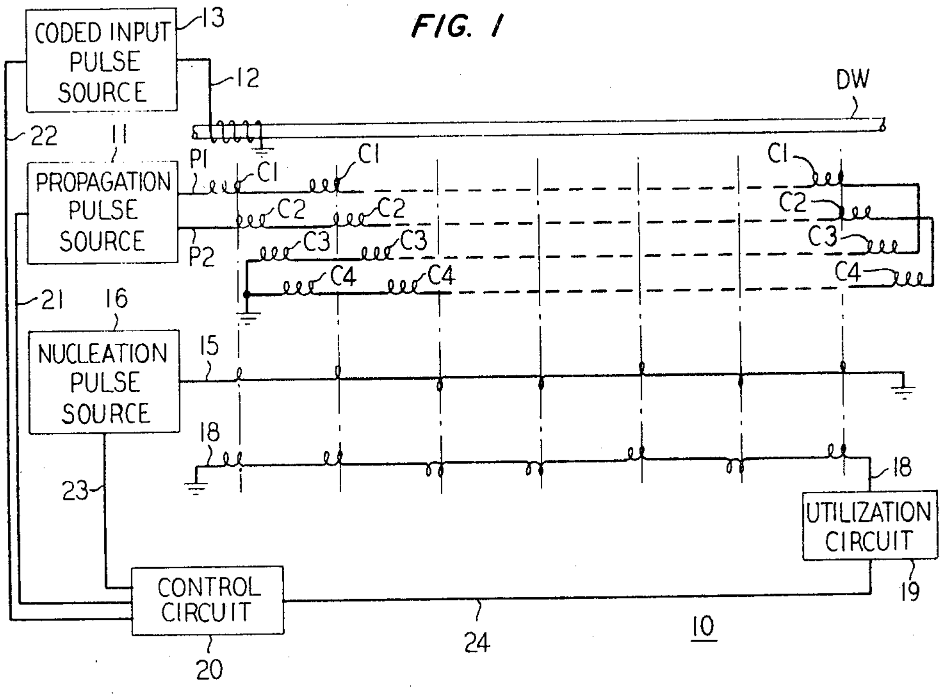
FIG. 1 is a schematic illustration of a character recognizer in accordance with this invention.

FIG. 1 shows a character recognizer 10 in accordance with this invention. The recognizer 10 includes, illustratively, a domain wall wire DW. First and second propagation conductors P1 and P2 coupled wire DW and define bit positions therealong. Specifically, conductor P1 includes sets of coils C1 and C3 and conductor P2 includes sets of coils C2 and C4. As can be seen in the figure, coils C1 and C2 couple wire DW in a first sense and coils C3 and C4 couple wire DW in a second sense. The coils are shown spaced apart from the representation of wire DW for clarity but are to be understood to couple wire DW. The coils, then, interleave as viewed from left to right, adjacent coils C1, C2, C3, and C4 defining a bit position. Illustratively, seven bit positions are, thus, defined along wire DW. Each of conductors P1 and P2 is connected between a propagation pulse source 11 and ground.

A conductor 12 couples an input position along wire DW defined by coils C1 and C2 of the first bit position to the left as viewed in FIG. 1. Conductor 12 is connected between a coded input pulse source 13 and ground. In response to an input pulse train representing a pattern of binary ones (and zeros), a reverse domain is nucleated (or not) in wire DW at the input position.

Figures 2, 3, 4, 5, 6, 7, 8, 9, 10, 11, 12, 13, 14, 15, 16:
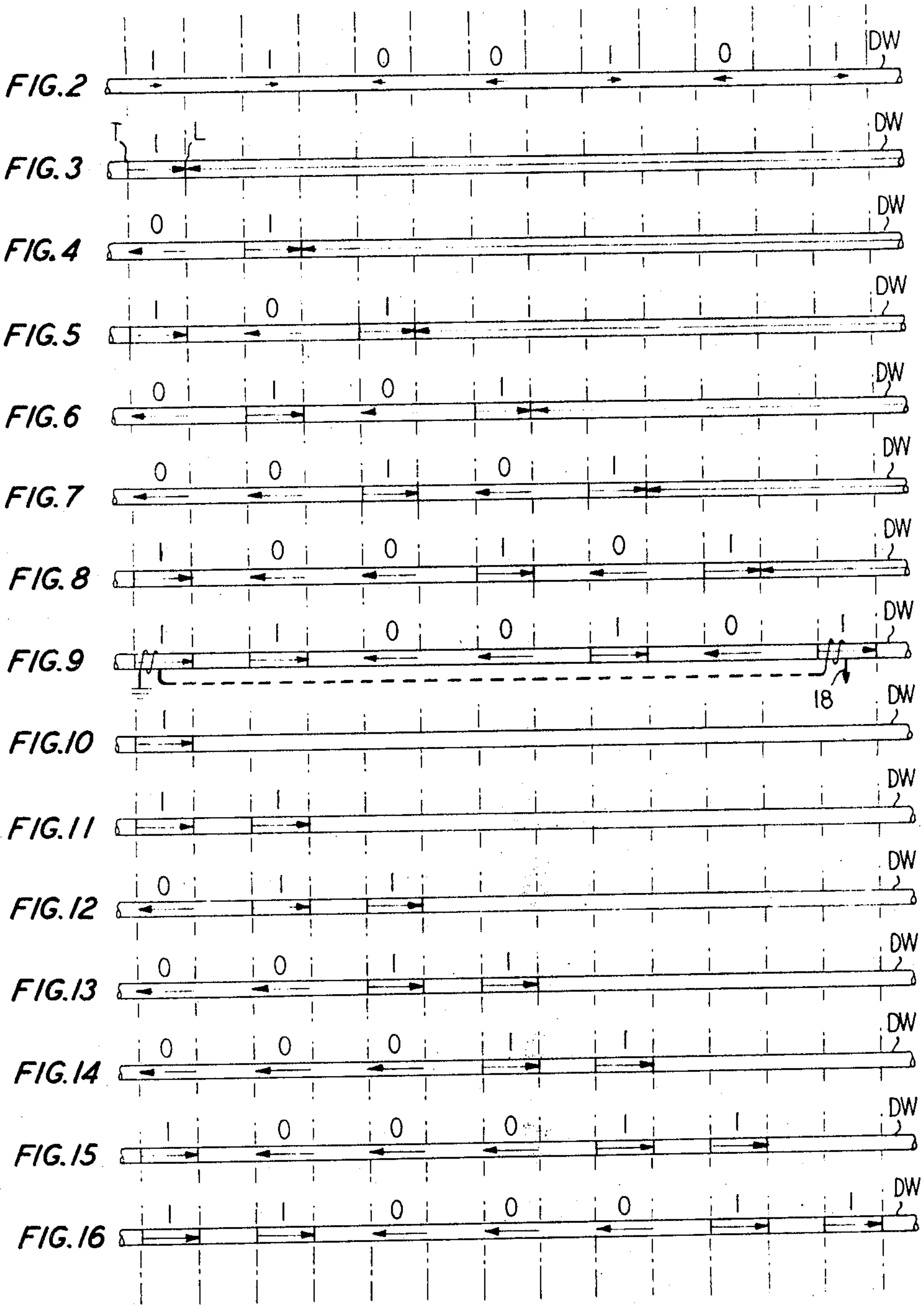
FIGS. 2 through 16 are schematic representations of portions of the recognizer of FIG. 1 showing the magnetic condition thereof during operation.

A conductor 15 is coupled to an unstable portion of each bit position along wire DW. An unstable portion of a bit position is defined as a portion having a length for which the demagnetizing fields thereabout are sufficient to spontaneously initialize the portion when a pulsed reversing field generated in that portion terminates. A bias field may be used to insure initialization. The senses in which conductor 15 couples the bit positions of wire DW are coded such that when conductor 15 is pulsed a pattern of magnetic fields is generated as shown in FIG. 2. Fields directed to the right represent a binary one and fields directed to the left represent a binary zero. Illustratively, conductor 15 is coded to establish a field pattern 1100101 reading from left to right as shown in FIG. 2 in unstable portions of the corresponding bit positions. Such fields are generated illustratively each second phase of the propagation cycle. Conductor 15 is connected between a nucleation pulse source 16 and ground.

A sense conductor 18 also couples the bit positions along wire DW in the same coded senses in which conductor 15 couples those bit positions. Conductor 18 is coupled between a utilization circuit 19 and ground.

It will become clear that when the reverse domain pattern stored sequentially in response to input codes via coded input pulse source 13, and advanced via the propagation pulses from bit position to bit position, matches the coded fields shown in FIG. 2, no pulse is induced in conductor 18 in response to an interrogate pulse on conductor 15 generating those coded fields. Accordingly, utilization circuit 19 registers a null in such an instance and a proper code is recognized.

Sources 11, 13, and 16, and utilization circuit 19 are connected to a control circuit 20 via conductors 21, 22, 23, and 24, respectively.

The various sources and circuits may be any such elements capable of operating in accordance with this invention.

The code recognized by the recognizer 10 of FIG. 1 is determined by the code senses in which conductor 15 couples the bit positions of wire DW. This code is easily changed by using a universal printed circuit board adapted to mate with otherwise "senseless" coils coupled to wire DW. Specifically, such a universal printed circuit board may include alternate current paths at each juncture to which a coil is to be connected. A selected path may be punched out in a well known manner to determine the coded sense of the coil connected at each juncture. The illustrative proper code shown is 1100101 as stated hereinbefore. We will now describe the operation for the detection of a proper code and, then, the operation for an improper code.

FIGS. 3 through 9 depict wire DW in consecutive stages of operation. FIG. 3 shows a first stable reverse domain stored in response to an input pulse from source 13 under the control of control circuit 20. The wire DW is assumed initialized to a direction represented by an arrow directed to the left as shown in FIG. 3. A stable reverse domain, then, is represented by an arrow directed to the right and bounded by leading and trailing domain walls designated L and T, respectively, as shown in FIG. 3. For convenient accounting, a zero is represented in the confines of a bit position by an unbounded arrow directed to the left as shown in FIG. 4, for example.

In accordance with the illustrative operation, first a binary one is received and next a binary zero is similarly received. The binary one, first received, is advanced four phases via pulse source 11 also under the control of control circuit 20 before the binary zero is received. Thus inputs conveniently correspond to a first phase of the propagation sequence spacing consecutive bits one bit position apart in wire DW. Conductor 15, conveniently, is pulsed every second phase by means of nucleation pulse source 16 also under the control of control circuit 20. Accordingly, the "interrogate" pattern of fields shown in FIG. 2 is generated every second phase. For the storage patterns shown in FIGS. 3 and 4, the interrogate pattern represents flux switched in some of the bit positions thus inducing a pulse in sense conductor 18. For the pattern shown in FIG. 3, mismatches between the storage pattern 10 (from left to right in FIG. 3) and the pattern shown in FIG. 2 exist in three bit positions. In each bit position in which a mismatch occurs flux temporarily switches providing a pulse in conductor 18. For the storage pattern of FIG. 4 three mismatches also occur.

FIG. 5 shows a one-zero-one storage pattern. A comparison between FIGS. 5 and 2 shows four mismatches. FIG. 6 also shows four mismatches when four information bits of the illustrative sequence are stored. Five bits are shown stored in FIG. 7. Again four mismatches occur. FIG. 8 shows the storage pattern for six bits of the illustrative sequence. Five mismatches occur. The illustrative sequence is shown completely stored in FIG. 9. The pattern shown in FIG. 9 is seen to exactly correspond to the pattern shown in FIG. 2. During the second phase following the advance of information to the positions shown in FIG. 9, conductor 15 is pulsed. Since all the bit positions are already saturated as shown in FIG. 9 in directions to which they are driven when conductor 15 is pulsed, only negligible flux shuttling occurs in response to that pulse and a null is detected in utilization circuit 19 under the control of control circuit 20.

The sequence of FIGS. 10 through 16 depicts wire DW and the magnetic condition therein when an improper code is received. The illustrative improper code is 1100011. This code is seen to correspond to the proper code as shown in FIG. 2 except for the reversal of the second and third bits from the right as viewed. Again the pattern shown in FIG. 2 is generated every second phase by means of source 16 under the control of control circuit 20. A binary one is received on a first phase as shown in FIG. 10 and interrogation occurs on the second phase. On the next first phase the binary one is in the position shown in FIG. 11 and a next bit, a binary one also, is stored as shown in FIG. 11. The process repeats, as described, under the control of control circuit 20. FIG. 12 shows the storage pattern for three bits of the improper code. The number of mismatches is seen to be four as is clear from a comparison between FIG. 12 and FIG. 2.

FIG. 13 shows the storage pattern for four bits of the improper code. The number of mismatches is seen to be six. FIGS. 14 and 15 show the storage patterns for five and six bits of the improper codes. Four and three mismatches occur respectively. FIG. 16 shows the storage pattern for the complete improper code. It is clear that two mismatches occur. Thus when an improper code is stored, conductor 18 is pulsed each time conductor 15 is pulsed.

Figure 17:
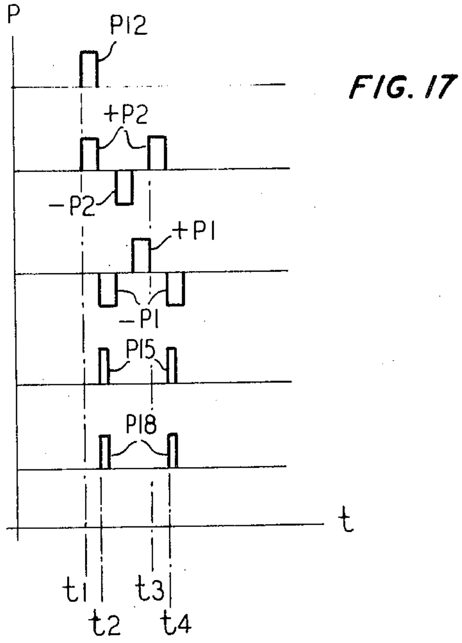
FIG. 17 is a pulse diagram of the operation of the character recognizer of FIG. 1.

FIG. 17 is a pulse diagram of the operation of the character recognizer of FIG. 1 in accordance with this invention. A four-phase propagation cycle is determined by the propagation pulses shown initiated at time $t1$ in FIG. 17. A full four-phase cycle for the illustrative arrangement of FIG. 1 is shown specifically as consecutive pulses +P2, −P1, −P2, +P1 where the plus and minus signs indicate the polarity of currents in conductors P2 and P1. An input pulse P12 occurs on a first phase which corresponds to pulse +P2. An "interrogate" pulse P15 occurs on conductor 15 on each second phase which corresponds to a pulse −P1 shown at time $t2$ in FIG. 17. An output pulse P18 appears in conductor 18 in response to the pulse P15 if mismatches occur as described.

At time $t3$ in FIG. 17, a next first phase occurs and a next input is received. If a zero input occurs, that is, if a pulse P12 is absent at that time, the situation in wire DW is as illustrated in FIG. 4. In response to the next interrogate pulse P15 at time $t4$ in FIG. 17 an output pulse P18 is provided as described hereinbefore. The operation continues as described in connection with FIGS. 5 through 9 until a null is provided or, alternatively, in a manner analogous to that described in connection with FIGS. 10 through 16 indicating an improper code.

The invention has been described in terms of magnetic wires and coils coupled to those wires. It is clear that other implementations may be used as well. For example, thin films may be used with printed solenoids coupled thereto.

Accordingly, what has been described is considered to be only illustrative of the principles of this invention and various and numerous other arrangements may be devised by one skilled in the art without departing from the spirit and scope of this invention.

What is claimed is:

1. A combination comprising a magnetic propagation medium including $n$ positions, first means providing a magnetic field in an unstable portion of each of said positions, said magnetic fields having coded polarities, sensing means coupled to said positions for detecting the absence of flux switching in said positions, means responsive to an input code selectively providing a stable magnetic discontinuity at an input position in said medium, means stepping stable magnetic discontinuities from position to position through said medium, and means activating said first means each time stable magnetic discontinuities are advanced one position.

2. A combination in accordance with claim 1 wherein said propagation medium is a magnetic wire and said stable magnetic discontinuities are reverse magnetized domains.

3. A combination in accordance with claim 2 wherein said sensing means comprises a conductor coupled to said bit positions in accordance with said coded polarities.

4. A combination comprising a domain wall wire including $n$ bit positions, first means simultaneously generating a magnetic field in an unstable portion of each of said bit positions, said magnetic fields having coded polarities, sensing means coupled to said bit positions in corresponding coded polarities for detecting the absence of flux switching in said positions, means responsive to coded input signals providing a pattern of reverse domains in said wire, means stepping reverse domains from bit position to bit position through said wire, and means for activating said first means each time reverse domains are advanced one position through said wire.

5. An $n$ bit character recognizer comprising:

a magnetic domain wall wire, first means defining $n$ bit positions in said wire, input means responsive to a coded signal representing each successive bit of an $n$ bit character for selectively nucleating a reverse magnetized domain at an input position of said wire, second means including said first means and operative in a step-by-step manner for propagating said domains from said input position to successive bit positions in said wire, means defining a predetermined code in said $n$ bit positions of said wire, means operative on each successive step of said second means for comparing the pattern of said reverse domains in said $n$ bit positions with said predetermined code, and means controlled by said last-named means for indicating a match between said pattern and said predetermined code.

6. An $n$ bit character detector in accordance with claim 5 wherein said means defining said predetermined code comprises means generating a magnetic field in an unstable portion of each of said bit positions, said fields having polarities in accordance with said predetermined code.

7. An $n$ bit character detector in accordance with claim 6 wherein said means operative on each successive step comprises sensing means coupled to said bit positions in accordance with said predetermined code.

References Cited

UNITED STATES PATENTS

| | | | |
|---|---|---|---|
| 3,248,716 | 4/1966 | Snyder | 340—174 |
| 3,257,650 | 6/1966 | Koerner | 340—174 |

TERRELL W. FEARS, Primary Examiner

GARY M. HOFFMAN, Assistant Examiner

U.S. Cl. X.R.

340—146.3